Jan. 13, 1931.  J. BETHUNE  1,788,701
GEARING
Filed Aug. 5, 1929  2 Sheets-Sheet 1

INVENTOR
John Bethune
BY
ATTORNEYS

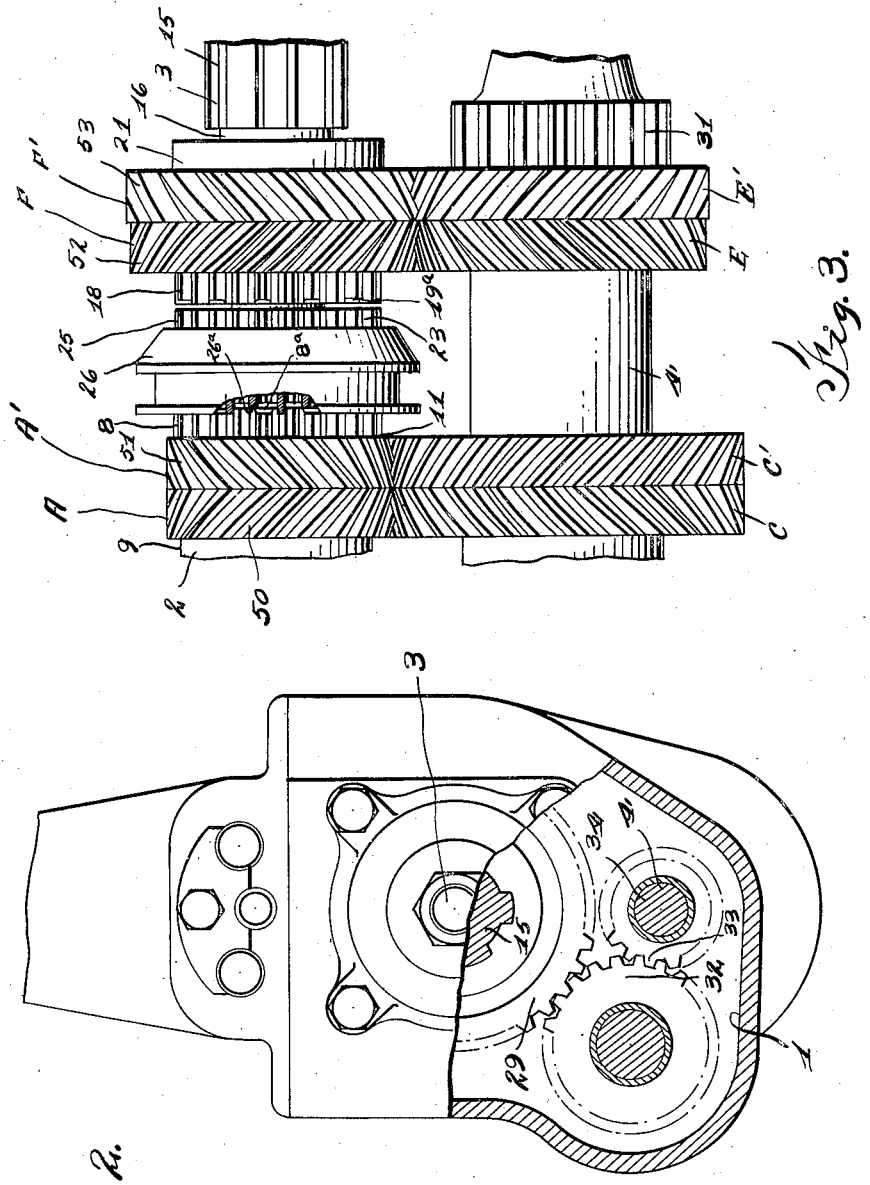

Patented Jan. 13, 1931

1,788,701

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

GEARING

Application filed August 5, 1929. Serial No. 383,677.

The invention relates generally to the transmission of power through gearing and has for its primary object the elimination or reduction of noise.

This application is a continuation in part of my co-pending application, Serial No. 266,760, filed April 2, 1928.

In the present state of the art various attempts have been made to reduce gear noise in power transmission mechanism. Among these are the use of helical gears or other gearing in which there is an overlapping engagement and disengagement of the gear teeth. Another attempted method for quieting gearing is through greater mechanical perfection in its construction as for instance by accurate grinding of the teeth. In actual practice, however, it has frequently been found that these highly perfected gears are less quiet in operation than gears of more imperfect construction.

The present invention is based on the discovery that where a plurality of simultaneously loaded equal ratio gear trains are interposed between a rotary drive shaft and a rotary driven shaft and where the same trains have certain differential characteristics such as a slight difference in pitch or of a transverse angle of the teeth, the noise of operation will be greatly reduced. While I do not fully understand the reason for this effect, I have conclusively demonstrated that it occurs, possibly due to the mutual interference and counteraction of noise producing vibrations generated by the respective trains. Whether or not this is the correct theory, the fact is indisputable that vibrations of a frequency and intensity which produce noise are largely eliminated.

The improvement is applicable to all types of mechanism in which power is transmitted through gearing but I shall specifically describe and illustrate its use in connection with a variable speed transmission mechanism such as used for motor vehicles. For such use the equal ratio differential characteristic gear trains are preferably arranged so as to form the so-called herringbone gears in which the teeth are oppositely inclined to develop counteracting end thrusts. The different characteristics of the two trains are preferably a slight difference in pitch but without change of ratio between the drive and driven members. Thus the power will be transmitted substantially equally by the two trains but without the noise usually developed where a single train is used.

In the drawings:

Figure 2 is a cross section thereof on line 2—2 of Figure 1;

Figure 3 is a side elevation of the herringbone gear trains and the clutch for co-operating therewith.

Figure 1:
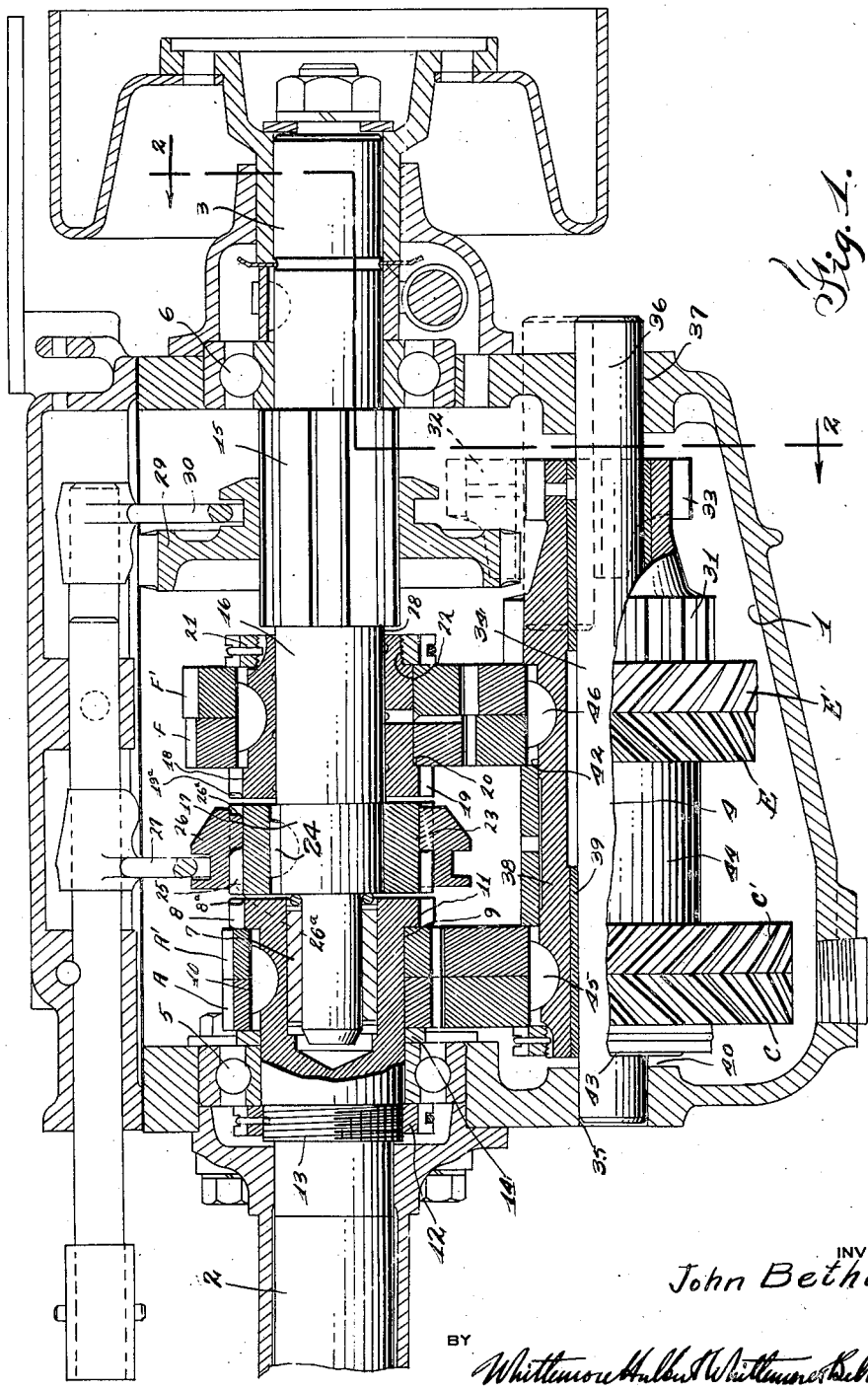
Figure 1 is a longitudinal section through a transmission gearing of the improved construction.

Referring now to the embodiment of the invention illustrated in the drawings, the transmission comprises a casing 1 in which is suitably journaled the driving or clutch shaft 2. 3 is the main shaft or driven shaft arranged in axial alignment with the driving shaft 2 and 4 is a countershaft parallel to the driving and driven shafts. As shown the driving shaft 2 is mounted in a ball bearing 5 and the driven shaft in a ball bearing 6 at one end thereof and a roller bearing 7 at the opposite end, said roller bearing being arranged within the hollow end of the clutch shaft in the conventional manner. The clutch shaft 2 has at its inner end the peripheral clutch teeth 8 which project outwardly beyond the cylindrical surface 9. The constant mesh gear AA' is mounted on the cylindrical surface 9 and is suitably drivingly connected thereto by means of a key or spline 10. The gear is fixedly mounted to prevent axial displacement by clamping the same against the shoulder 11 formed by the projecting clutch teeth 8 by means of a clamping nut 12 engaging the threaded portion 13 of the clutch shaft. In the preferred construction the clamping nut 12 seats directly on the inner face of the ball bearing 5 which in turn bears against a spacing collar 14.

The driven shaft 3 is provided with a splined portion 15, a cylindrical portion 16 of smaller diameter and another cylindrical portion 17 of slightly reduced diameter. Mounted on the cylindrical portion 16 is a sleeve 18 having clutch teeth 19 at one end thereof projecting radially outward and forming the shoulder 20. FF' is the second speed gear clamped to the sleeve 18 between the shoulder 20 and the clamping nut 21, which later is in threaded engagement with the threaded portion 22 of the sleeve 18. Between the sleeve 18 and the clutch shaft 2 is a collar 23 fixedly secured to the driven shaft 3 by means of a key or spline 24. The outer surface of the collar 23 is splined at 25 for receiving the correspondingly splined clutch ring 26. The ring is axially shiftable by means of a shifting fork 27 into alternative engagement with the clutch teeth 8 or the clutch teeth 19.

The sleeve 18 on which the second speed gear FF' is clamped is axially slidable on the cylindrical portion 16 between the collar 23 and the splined portion 15, and clearance is provided as indicated at 28 for this purpose. The cylindrical surface 16 of the driven shaft is preferably hardened and ground as is also the inner surface of the sleeve 18 which cooperates therewith. As will be hereinafter noted, the sleeve 18 is rotatable relative to the driven shaft 3 but only when no load is being transmitted by the gear FF'. When this gear is utilized for driving purposes it is always fixed relative to the driven shaft 3. It has been found that the two cooperating hardened bearing surfaces are particularly advantageous under conditions as described.

29 is a spur gear slidable on the splined portion 15 of the driven shaft and axially shiftable by means of the shifting fork 30. This gear is engageable in one position of adjustment with the countershaft gear 31 and in the opposite position of adjustment with an idler pinion 32 which in turn meshes with the countershaft pinion 33.

The countershaft 4 consists of a central rod 34 axially insertable into the transmission casing with the small diameter end engaging the aperture 35 and the opposite end 36 engaging the bearing 37. Rotatably mounted on the rod 34 is a sleeve 38 which is separated from said rod by the bushings 39. The sleeve 38 is not only rotatable but is also axially slidable on said bushings, clearance spaces 40 being provided for this purpose. The gears 31 and 33 are preferably formed integral with the sleeve 38. The constant mesh gear CC' and the second speed gear EE' are both preferably removable from the sleeve 38 and arranged on the outer cylindrical surface 42 thereof. These gears are clamped in fixed relation to each other by means of a clamping nut 43 and a spacer 44. The gears CC' and EE' are suitably drivingly secured to the sleeve 38 by the keys or splines 45 and 46 respectively.

The gears AA', CC', EE' and FF' are all preferably provided with herring bone teeth and as heretofore stated the teeth of these gears are preferably arranged at a high helical angle. It has been found that the maximum quietness is obtained with an angle of 40° or over, while practical considerations as to strength of the teeth require an upper limit of approximately 50°. A very desirable set of gears can be constructed utilizing a helical angle of 44° and 25 minutes.

The herring bone gears are also preferably constructed of two separable rings, and as shown in Figure 3 the ring A has the teeth 50 extending at an angle in one direction while the complementary gear A' has its teeth 51 arranged at the same angle but in a direction such as to form the herring bone type of gear tooth. One of the advantages of this construction is that it enables the use of teeth of different pitch for the two halves of each gear and as shown in Figure 3 the teeth 52 in the gear F are represented as being of sixteen pitch, while the teeth 53 on the complementary ring F' are represented as being of ten pitch. The advantage of this construction is the elimination of certain vibration periods in the transmission. It will be understood of course that the mating halves of the gear EE' must necessarily be of a pitch corresponding respectively to the mating halves of the gear FF'.

To facilitate the quiet engagement of the internal clutch teeth of the ring 26 alternatively with the external clutch teeth 8 and 19, each alternate tooth has an end portion thereof cut away, as shown in 8a, 19a and 26a in Figure 1. This provides in each of said members interdental spaces of more than twice the normal width, so that when the ring 26 is shifted in either direction it will engage the external gear teeth without clashing.

In the operation of the transmission as described above, the high speed is obtained by shifting the fork 27 to the left in Figure 1 thereby engaging the clutch ring 26 with the clutch teeth 8 and directly connecting the driving shaft 2 with the driven shaft 3. In this position it will be noted that the constant mesh gears AA' and CC' cause the countershaft sleeve 38 to be driven thereby causing the gear FF' to be revolved on the driven shaft at a differential speed with relation thereto.

The second speed is obtained by shifting the clutch ring 26 into engagement with the clutch teeth 19, thus drivingly connecting the gear FF' to the driven shaft. The drive is then transmitted through the constant mesh gears AA' and CC', the countershaft sleeve 38, the herring bone gears EE' and FF' to the driven shaft 3.

First or low speed is obtained by shifting gear 29 to the left in Figure 1 into engagement with the countershaft gear 31. The reverse speed is obtained by moving gear 29 in the opposite direction into engagement with reverse idler pinion 32.

The invention herein disclosed relates to a gear train having a plurality of equal ratio simultaneously loaded gear train portions. The gear train is represented in the drawings by the gears EE' and FF'; the gear train portions are respectively E, F and E', F', and these gear train portions are each of the same ratio. Furthermore, the gear train portions E, F and E', F' each simultaneously transmit a portion of the load from the countershaft sleeve 38 to the driven shaft 3. However, the gear train portions E, F and E', F' are structurally different from each other in that they are provided with noise-reducing differential characteristics. By this term, I mean to cover such differences of structure as have the effect of reducing the noise of operation of the gear train EE', FF' as for example a difference in pitch between the teeth in the gear train portion E, F and the gear train portion E', F'.

What I claim as my invention is:

1. The combination with a rotary drive member and a rotary driven member, of a gear train therebetween having a plurality of equal ratio simultaneously loaded gear train portions between said members, said gear train portions having noise-reducing differential characteristics.

2. The combination with a rotary drive member and a rotary driven member, of a gear train therebetween having a plurality of equal ratio simultaneously loaded helical gear train portions between said members, said gear train portions having oppositely inclined helical angles and noise-reducing differential characteristics.

3. The combination with a rotary drive member and a rotary driven member, of a gear train therebetween having a plurality of equal ratio simultaneously loaded gear train portions between said members, the gear train portions having noise-reducing differential pitch.

4. In a transmission, the combination of a housing, shafts mounted therein and a gear train connecting said shafts including a plurality of equal ratio simultaneously loaded gear train portions having noise-reducing differential characteristics.

5. In a transmission, the combination of a housing, parallelly arranged shafts mounted therein and herringbone gears connecting said shafts comprising a pair of equal ratio simultaneously loaded helical gear train portions having oppositely inclined helical angles and noise-reducing differential characteristics.

6. In a transmission, the combination of a housing, parallelly arranged shafts mounted therein and herringbone gears connecting said shafts and comprising a pair of equal ratio simultaneously loaded helical gear train portions, said gear train portions being of oppositely helical angles and having noise-reducing differential characteristics.

7. A herringbone gear having the oppositely inclined teeth of different pitch.

8. A composite gear comprising two separable gear portions each having helically arranged teeth thereon, the teeth on each gear being inclined oppositely to the other, said gear portions being of different pitch.

9. A composite gear comprising two separable ring gears of slightly different outer diameter, each ring gear having helical teeth thereon inclined in opposite directions from the plane of division between the gears, said ring gears being of different pitch.

10. A composite gear comprising two gear portions having peripheral teeth thereon, the teeth on the two gears being inclined in opposite directions from the plane of division thereof, said gears being of different pitch and having different tooth depths.

11. A herringbone gear having the oppositely inclined teeth of different pitch and the same helical angle.

12. A composite gear comprising two separable gear portions, each having helically arranged teeth thereon, the teeth on each gear being inclined oppositely to the other at the same helical angle, said gear portions being of different pitch.

13. A system of gearing comprising two intermeshing herringbone gears, each herringbone gear being composed of two portions having teeth of different pitch and the same helical angle.

In testimony whereof I affix my signature.

JOHN BETHUNE.